United States Patent [19]

Ikeno et al.

[11] Patent Number: 5,792,723
[45] Date of Patent: Aug. 11, 1998

[54] PLATINUM CATALYST, ITS PREPARATION, AND CURABLE ORGANOPOLYSILOXANE COMPOSITION COMPRISING THE SAME

[75] Inventors: Masayuki Ikeno; Hideki Sugahara; Hironao Fujiki, all of Usui-gun, Japan

[73] Assignee: Shin-Etsu Chemical Co., Ltd., Japan

[21] Appl. No.: 752,938

[22] Filed: Nov. 20, 1996

[30] Foreign Application Priority Data

Nov. 21, 1995 [JP] Japan .................. 7-326575

[51] Int. Cl.[6] .................. B01J 31/02
[52] U.S. Cl. .................. 502/158; 502/150; 502/159; 502/171; 502/232; 502/258; 502/261; 502/262; 502/334
[58] Field of Search .................. 502/150, 158, 502/159, 171, 232, 258, 261, 262, 334

[56] References Cited

U.S. PATENT DOCUMENTS 3,699,072 10/1972 Wada et al. .................. 524/785
3,715,334 2/1973 Karstedt .................. 528/15
3,775,452 11/1973 Karstedt .................. 528/15
4,421,903 12/1983 Ashby .................. 502/158

Primary Examiner—Walter D. Griffin
Assistant Examiner—Nadine Preisch
Attorney, Agent, or Firm—Millen, White, Zelano & Branigan, P.C.

[57] ABSTRACT

A platinum catalyst containing (A) a platinum complex having a vinyl-containing organosiloxane ligand and (B) a vinyl-containing organopolysiloxane is prepared by mixing components (A) and (B) such that at least 2 mol of vinyl group in component (B) is available per mol of platinum atom in component (A) and heating the mixture at 40°–100° C. for at least 1 hour. When blended in an addition reaction curing type organosiloxane composition, the platinum catalyst has the advantage that even after long-term storage at elevated temperatures, it remains stable and active enough to cause the organosiloxane composition to cure.

17 Claims, No Drawings

PLATINUM CATALYST, ITS PREPARATION, AND CURABLE ORGANOPOLYSILOXANE COMPOSITION COMPRISING THE SAME

BACKGROUND OF THE INVENTION

1. Field of the Invention

This invention relates to a platinum catalyst for use in hydrosilylation, a method for making the same, and a curable organopolysiloxane composition containing the same.

2. Prior Art

For compositions comprising an organopolysiloxane containing a vinyl group and an organohydrogenpolysiloxane containing a hydrogen atom attached to a silicon atom, various catalysts are used to promote addition reaction or hydrosilylation. Among others, platinum-alkenylsiloxane complexes as disclosed in U.S. Pat. No. 3,715,334 corresponding to JP-B 28795/1971 have been commonly used because of rapid curing. U.S. Pat. No. 3,814,730 corresponding to JP-B 423/1980 discloses that platinum-alkenylsiloxane complexes substantially free of halogen are improved in catalytic activity. These catalysts, however, are low in long-term shelf stability at elevated temperature and even at room temperature.

For overcoming this drawback, U.S. Pat. No. 5,057,476 and U.S. Pat. No. 5,098,980, both corresponding to JP-A 89947/1991 disclose that a siloxane containing both aryl and alkenyl groups in a molecule is effective for enhancing the stability of platinum complexes. With this approach, however, the stability at elevated temperatures does not last long. Autoxidation products (e.g., aldehydes and peroxides) of various additives and impurities in fillers can poison the catalysts, which lose catalytic activity. This is a serious problem in the application where room temperature cure is essential as in dental materials. U.S. Pat. No. 3,699,073 corresponding to JP-B 10947/1973 discloses that high vinyl content siloxanes are effective for extending the pot life of addition reaction, but still to a less satisfactory extent.

SUMMARY OF THE INVENTION

Therefore, an object of the invention is to provide a platinum catalyst which is improved in long-term shelf stability. Another object is to provide a method for preparing the platinum catalyst. A further object is to provide a curable organopolysiloxane composition containing the platinum catalyst.

The present invention provides a platinum catalyst composition comprising (A) a platinum complex and (B) a vinyl-containing organopolysiloxane. The platinum complex (A) has a vinyl-containing organosiloxane of the following formula (1) or (2) as a ligand.

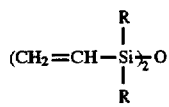

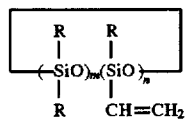

R is independently a substituted or unsubstituted monovalent hydrocarbon group having 1 to 8 carbon atoms, letter n is an integer of at least 1, m is an integer inclusive of 0, the sum of n+m is 3 to 8. The vinyl-containing organopolysiloxane (B) is of the following formula (3):

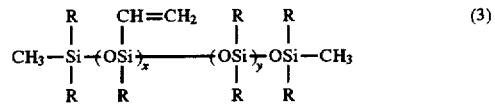

wherein R is as defined above, letters x and y are such numbers that the number of silicon atoms in a molecule ranges from 10 to 50, and the proportion of x relative to the number of silicon atoms in a molecule is 10 to 50 mol %. The platinum catalyst composition is prepared by mixing components (A) and (B) such that at least 2 mol of vinyl group in component (B) is available per mol of platinum atom in component (A) and heating and aging the mixture at a temperature of 40° to 100° C. for at least 1 hour. The resulting platinum catalyst composition is useful in hydrosilylation reaction. Quite unexpectedly, the platinum catalyst composition is improved in long-term shelf stability and less susceptible to deterioration at elevated temperatures.

Although JP-B 10947/1973 discloses that a high vinyl content siloxane is effective for extending the pot life of addition reaction as mentioned above, the objects of the invention are not achievable by simply mixing such siloxane with addition curing type organopolysiloxane compositions. The objects of the invention are achievable by heating a high vinyl content siloxane together with a platinum complex, especially heating and aging at a temperature of 40 to 100° C. for at least 1 hour.

DETAILED DESCRIPTION OF THE INVENTION

The platinum catalyst composition of the present invention uses component (A) in the form of a platinum complex having a vinyl-containing organosiloxane of the following formula (1) or (2) as a ligand.

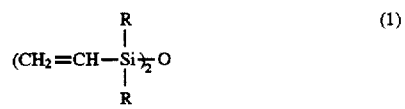

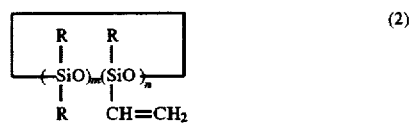

In the formulae, R is a substituted or unsubstituted monovalent hydrocarbon group having 1 to 8 carbon atoms, for example, alkyl groups such as methyl, ethyl, propyl, butyl, hexyl, and octyl; alkenyl groups such as vinyl, allyl, propenyl, and butenyl; aryl groups such as phenyl, tolyl, and xylyl; aralkyl groups such as benzyl and phenylethyl; and halo-substituted alkyl and aryl groups such as chloromethyl, bromoethyl, trifluoropropyl and chlorophenyl. Preferred are methyl, phenyl, trifluoropropyl and vinyl groups. The groups represented by R may be the same or different. Letter n is an integer of at least 1, m is an integer inclusive of 0, and the sum of n+m is 3 to 8.

Component (A) is well known in the art and disclosed, for example, in JP-B 23679/1972. It can be prepared by heating for reaction chloroplatinic acid and a low molecular weight siloxane in the presence of a basic salt.

Component (B) used herein is a vinyl-containing organopolysiloxane of the following formula (3) containing at least 10 mol % of a vinyl group in a side chain (that is, as a substituent on a silicon atom within the molecular chain) based on silicon atoms in its molecule. It is essential for stabilizing the platinum complex (A).

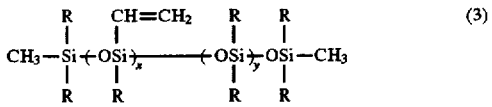

(3)

In formula (3), R is as defined above, letters x and y are such numbers that the number of silicon atoms in a molecule ranges from 10 to 50, especially 20 to 40. That is, the sum of x+y is an integer of 8 to 48, especially 18 to 38. The proportion of x relative to the number of silicon atoms in a molecule, that is, the proportion of vinyl groups relative to the number of silicon atoms in a molecule is 10 to 50 mol %, especially 15 to 25 mol %. A proportion of x of less than 10 mol % fails to provide sufficient stability whereas a proportion of x in excess of 50 mol % detracts from catalytic activity.

The amount of component (B) used is such that at least 2 mol of vinyl group in component (B) is available per mol of platinum atom in component (A). Less than 2 mol of vinyl group is less effective for stabilizing the platinum complex (A). Preferably 2 to 20 mol, especially 5 to 10 mol of vinyl group in component (B) is available per mol of platinum atom in component (A).

According to the present invention, after components (A) and (B) are mixed in such a proportion, the mixture is heated and aged. The heating temperature is 40° to 100° C., preferably 50° to 80° C. and the heating time is at least 1 hour, preferably 5 to 24 hours. A fully stable platinum catalyst composition is not obtained if the heating temperature is less than 40° C. or the heating time is less than 1 hour. The platinum complex precipitates as platinum black if the heating temperature exceeds 100° C.

The thus obtained platinum catalyst composition is useful as a catalyst for hydrosilylation reaction and can be blended in well-known addition reaction curing type organopolysiloxane compositions.

The curable organopolysiloxane composition in which the inventive platinum catalyst composition is to be blended should comprise an organopolysiloxane containing at least two alkenyl groups in a molecule and an organohydrogenpolysiloxane containing at least two, preferably at least three silicon atom-attached hydrogen atoms (SiH groups) in a molecule. For these polysiloxanes, well-known ones may be used in conventional amounts. Any of well-known components such as fillers may be blended in the organopolysiloxane composition.

More particularly, the alkenyl group-containing organopolysiloxane is a well-known organopolysiloxane commonly used in conventional addition curing type silicone rubber compositions as a base. It generally has a viscosity of about 60 to 50,000,000 centipoise at 25° C., especially about 100 to 5,000,000 centipoise at 25° C.

The alkenyl group-containing organopolysiloxane is preferably represented by the general compositional formula: $R^1_aSiO_{(4-a)/2}$ wherein $R^1$ is a substituted or unsubstituted monovalent hydrocarbon group having 1 to 10 carbon atoms, especially 1 to 8 carbon atoms. Examples of the hydrocarbon group include alkyl groups such as methyl, ethyl, propyl, isopropyl, butyl, hexyl, octyl, decyl, and cyclohexyl; alkenyl groups such as vinyl, allyl, propenyl, isopropenyl, butenyl, and hexenyl; aryl groups such as phenyl, tolyl, and xylyl; aralkyl groups such as benzyl and phenylethyl; and halo- or cyano-substituted hydrocarbon groups such as chloromethyl, bromoethyl, 3,3,3-trifluoropropyl, and cyanoethyl. The groups represented by $R^1$ may be the same or different. It is essential that at least two aliphatic unsaturated hydrocarbon groups, typically alkenyl groups be contained in a molecule. Preferably aliphatic unsaturated hydrocarbon groups, typically alkenyl groups are contained in an amount of about 0.05 to 2 mol % of substituents $R^1$ on silicon atoms. Letter a is a number in the range of 1.9 to 2.4, especially 1.95 to 2.05. The organopolysiloxane may be linear or a branched one containing a $R^1SiO_{3/2}$ or $SiO_{4/2}$ unit. Most often, it is a linear diorganopolysiloxane comprising a backbone consisting essentially of recurring diorganosiloxane units ($R^1_2SiO_{2/2}$) and blocked with a triorganosiloxy group ($R^1_3SiO_{1/2}$) at each end of its molecular chain. Basically the substituents on a silicon atom may be any of the above-exemplified groups although it is preferred that the aliphatic unsaturated group is vinyl or allyl. It is also preferred that methyl and phenyl groups be introduced as the other substituents. The alkenyl group(s) may be attached to a silicon atom at the end of the molecular chain and/or a silicon atom within the molecular chain. It is preferred from the aspects of a curing rate and cured properties that at least one alkenyl group attached to each end of molecular chain be contained. These organopolysiloxanes may be prepared by conventional methods, for example, by carrying out equilibration reaction between an organocyclopolysiloxane and a hexaorganodisiloxane in the presence of an alkali or acid catalyst.

The organohydrogenpolysiloxane serves as a crosslinking agent by reacting with the alkenyl-containing organopolysiloxane. Its molecular structure is not critical and there may be used any of various conventionally prepared compounds including compounds of linear, cyclic, and branched structures and resinous products of three-dimensional network structure. The organohydrogenpolysiloxane should contain at least two, preferably at least three hydrogen atoms each directly attached to a silicon atom (i.e., SiH groups) in a molecule. The compound has a substituent (other than hydrogen) attached to a silicon atom which may be the same as the substituents (other than the alkenyl group) in the above-mentioned alkenyl-containing organopolysiloxane.

The organohydrogenpolysiloxane is preferably represented by the general formula: $R^2_bH_cSiO_{(4-b-c)/2}$ wherein $R^2$ is a substituted or unsubstituted monovalent hydrocarbon group free of an aliphatic unsaturated bond and having 1 to 10 carbon atoms, especially 1 to 8 carbon atoms. Examples are the same as those exemplified for $R^1$ except for the alkenyl group. Letters b and c are numbers satisfying $0.6<b<2.2$, $0.002 \leq c<2$, and $0.8<b+c \leq 3$, preferably $1.5 \leq b \leq 2$, $0.01 \leq c \leq 1$, and $1.5<b+c \leq 2.7$.

The organohydrogenpolysiloxane should preferably have a viscosity of 0.5 to 1,000 centipoise at 25° C., especially 1 to 500 centipoise at 25° C., which corresponds to a number of silicon atoms in a molecule of 2 to 300, especially 4 to 200. Examples of the organohydrogenpolysiloxane include siloxane oligomers such as 1,1,3,3-tetramethyldisiloxane, 1,3,5,7-tetramethyltetracyclosiloxane and 1,3,5,7,8-pentamethylpentacyclosiloxane; and silicone resins comprising $R^2_2(H)SiO_{1/2}$ and $SiO_{4/2}$ units and optionally containing a $R^2_3SiO_{1/2}$, $R^2_2SiO_{2/2}$, $R^2(H)SiO_{2/2}$, $(H)SiO_{3/2}$ or $R^2SiO_{3/2}$ unit, such as both end trimethylsiloxy group-blocked methylhydrogenpolysiloxane, both end trimethylsiloxy group-blocked dimethylsiloxane/methylhydrogensiloxane copolymers, both end silanol group-blocked methylhydrogenpolysiloxane, both end silanol group-blocked dimethylsiloxane/methylhydrogensiloxane copolymers, both end dimethylhydrogensiloxy group-blocked dimethylpolysiloxane, both end dimethylhydrogensiloxy group-blocked methylhydrogenpolysiloxane, and both end dimethylhydrogensiloxy group-blocked dimethylsiloxane/methylhydrogensiloxane copolymers.

Preferably the organohydrogenpolysiloxane is blended in such amounts that the number of moles of a hydrogen atom attached to a silicon atom (i.e., SiH group) in the organohydrogenpolysiloxane is 0.4 to 5 equivalents, more preferably 0.8 to 2 equivalents per mole of an alkenyl group in the alkenyl group-containing organopolysiloxane. With less than 0.4 equivalents, cured silicone rubber would have a low crosslinking density and hence, poor heat resistance. With more than 5 equivalents, there would arise a foaming problem due to dehydrogenation reaction, which could adversely affect heat resistance.

These organohydrogenpolysiloxanes can be prepared by conventional well-known methods, for example, simply by carrying out equilibration reaction between octamethylcyclotetrasiloxane and/or tetramethylcyclotetrasiloxane and a compound having a triorganosilyl or diorganohydrogensiloxy group such as hexamethyldisiloxane and 1,3-dihydro-1,1,3,3-tetramethyldisiloxane, which can form a terminal group, in the presence of a catalyst such as sulfuric acid, trifluoromethanesulfonic acid and methanesulfonic acid at a temperature between −10° C. and +40° C.

In the organopolysiloxane composition of the invention, there may be blended a reinforcing filler, for example, silica fines having a specific surface area of 50 to 1,000 m²/g (BET) such as fumed silica and precipitated silica. It is also acceptable to blend non-reinforcing fillers such as quartz flour, diatomaceous earth, and calcium carbonate, coloring agents including inorganic pigments such as Cobalt Blue and organic dyes, and agents for improving heat resistance, flame retardance and adhesion such as cerium oxide, zinc carbonate, manganese carbonate, red iron oxide, titanium oxide, and carbon black; and conventional well-known agents for controlling addition reaction such as triallyl isocyanurate, alkyl maleates, acetylene alcohols, and silane or siloxane modified products thereof, hydroperoxide, tetramethyl ethylenediamine, benzotriazole, and mixtures thereof.

The platinum catalyst composition is added to an organosiloxane composition in a catalytic amount, preferably such that 1 to 500 ppm, especially 3 to 100 ppm of platinum atom is available based on the sum of the alkenyl group-containing organopolysiloxane and the organohydrogenpolysiloxane.

When the platinum catalyst of the invention is blended in an addition reaction curing type organosiloxane compositions the platinum catalyst has the advantage that even after long-term storage at elevated temperatures, it remains stable and active enough to cause the organosiloxane composition to cure at temperatures commonly used for curing compositions of this type.

EXAMPLE

Examples of the present invention are given below by way of illustration and not by way of limitation. All parts are by weight. Me is methyl and Vi is vinyl. The viscosity was measured at 25° C.

Example 1

A mixture of 16 grams of chloroplatinic acid (H$_2$PtCl$_6$) having a platinum content of 40%, 80 grams of ethanol, 34 grams of 1,3-divinyl-1,1,3,3-tetramethyldisiloxane, and 34 grams of sodium hydrogen carbonate was heated for reaction at 75° C. for 4 hours. The resulting salt was removed by filtration. The reaction solution was washed with 20 grams of ethanol, obtaining an ethanol solution of a platinum complex having 1,3-divinyl-1,1,3,3-tetramethyldisiloxane as a ligand and a platinum content of 4.7%. The excess ethanol was removed in vacuo and the precipitating salt was filtered off. The residue was diluted at 25° C. with a both end vinyldimethylsiloxy group-blocked linear dimethylpolysiloxane having a viscosity of 600 centipoise such that a platinum content of 1% was reached, yielding a platinum catalyst (A).

To 10 grams of platinum catalyst (A) was added 1 gram of dimethylpolysiloxane of the following structural formula (I) having a Vi content of 20 mol % based on the silicon atoms in its molecule. The mixture was heated at 80° C. for 48 hours, obtaining a platinum catalyst (B).

$$Me_3SiO(MeViSiO)_4(Me_2SiO)_{14}SiMe_3 \qquad (I)$$

Comparative Example 1

A platinum catalyst was prepared as in Example 1 except that 0.22 gram of 1,3,5,7-tetravinyl-1,3,5,7-tetramethylcyclotetrasiloxane was used instead of the dimethylpolysiloxane of formula (I). A large amount of platinum black formed.

Comparative Example 2

A platinum catalyst was prepared as in Example 1 except that 3.9 grams of a dimethylpolysiloxane of the following structural formula (II) having a Vi content of 5 mol % based on the silicon atoms in its molecule was used instead of the dimethylpolysiloxane of formula (I). A large amount of platinum black formed.

$$Me_3SiO(MeViSiO)_2(Me_2SiO)_{36}SiMe_3 \qquad (II)$$

Example 2

A paste A1 was prepared by using 80 parts of a both end vinyldimethylsiloxy group-blocked linear dimethylpolysiloxane having a viscosity of 2,500 centipoise, 20 parts of a both end vinyldimethylsiloxy group-blocked linear dimethylpolysiloxane raw rubber having an average degree of polymerization (viscosity average) of 8,000, 0.7 part of platinum catalyst (B) prepared in Example 1, 190 parts of quartz flour having a mean particle size of 4 µm, 20 parts of diatomaceous earth having a mean particle size of 2 µm, and 40 parts of liquid paraffin (d=0.88, 140 centistokes) and mixing them in an agitating mixer.

A paste B1 was prepared as was paste A1 except that 75 parts of a both end vinyldimethylsiloxy group-blocked linear dimethylpolysiloxane having a viscosity of 2,500 centipoise and 5 parts of a methylhydrogenpolysiloxane containing 33 mol % of a methylhydrogensiloxane unit based on the silicon atoms in the molecule and having a viscosity of 12 centistokes were used, and platinum catalyst (B) was omitted.

Equal amounts of pastes A1 and B1 were mixed to form a mixture which was measured for a pot life at 23° C. The cured product was measured for hardness after 5 minutes and 30 minutes. Separately, paste A1 was previously heated at 80° C. for 7 days for forced deterioration before the pot life of its mixture with paste B1 and the hardness of a cured product were measured under the same conditions. The results are shown in Table 1.

Comparative Example 3

Paste A2 was prepared as in Example 2 except that 0.64 part of platinum catalyst (A) was used.

Equal amounts of pastes A2 and B1 were mixed to form a mixture which was measured for a pot life at 23° C. The cured product was measured for hardness. Separately, paste A2 was previously heated at 80° C. for 7 days for forced deterioration before the pot life of its mixture with paste B1 and the hardness of a cured product were measured under the same conditions. The results are shown in Table 1.

Comparative Example 4

Paste A3 was prepared by mixing 350.64 parts of paste A2 in Comparative Example 3 with 0.06 part of the dimethylpolysiloxane of formula (I) having a Vi content of 20 mol % based on the silicon atoms in its molecule used in Example 1.

Equal amounts of pastes A3 and B1 were mixed to form a mixture which was measured for a pot life at 23° C. The cured product was measured for hardness. Separately, paste A3 was previously heated at 80° C. for 7 days for forced deterioration before the pot life of its mixture with paste B1 and the hardness of a cured product were measured under the same conditions. The results are shown in Table 1.

TABLE 1

|  | Example 2 | | CE 3 | | CE 4 | |
| --- | --- | --- | --- | --- | --- | --- |
|  | Fresh | Aged @80° C. | Fresh | Aged @80° C. | Fresh | Aged @80° C. |
| Pot life (sec.) | 50 | 53 | 35 | 300 | 50 | 300 |
| Hardness, | | | | | | |
| 5 min. | 17 | 13 | 15 | 0 | 14 | 0 |
| 30 min. | 56 | 54 | 57 | 1 | 56 | 1 |

Each of these pastes, 1 kg, was contained in a polyethylene bag and stored at room temperature for 6 months from May to October. A similar test was then carried out to find similar results to those associated with 7-day storage at 80° C.

Example 3

A paste A4 was prepared by uniformly mixing 100 parts of a both end vinyldimethylsiloxy group-blocked linear dimethylpolysiloxane having a viscosity of 1,000 centipoise with 0.22 part of platinum catalyst (B).

A paste B2 was prepared by uniformly mixing 100 parts of a both end vinyldimethylsiloxy group-blocked linear dimethylpolysiloxane having a viscosity of 1,000 centipoise and 7 parts of a methylhydrogenpolysiloxane containing 41 mol % of a methylhydrogensiloxane unit based on the silicon atoms in the molecule and having a viscosity of 12 centistokes.

Equal amounts of pastes A4 and B2 were mixed to form a mixture which was measured for a pot life at 23° C. The cured product was measured for hardness after 30 minutes. Separately, paste A4 was previously heated at 80° C. for 7 days for forced deterioration before the pot life of its mixture with paste B2 and the hardness of a cured product were measured under the same conditions. The results are shown in Table 2.

Comparative Example 5

Paste A5 was prepared as in Example 3 except that 0.20 part of platinum catalyst (A) was used.

Equal amounts of pastes A5 and B2 were mixed to form a mixture which was measured for a pot life at 23° C. The cured product was measured for hardness. Separately, paste A5 was previously heated at 80° C. for 7 days for forced deterioration before the pot life of its mixture with paste B2 and the hardness of a cured product were measured under the same conditions. The results are shown in Table 2.

TABLE 2

|  | Example 3 | | CE 5 | |
| --- | --- | --- | --- | --- |
|  | Fresh | Aged @80° C. | Fresh | Aged @80° C. |
| Pot life (sec.) | 150 | 160 | 100 | 650 |
| Hardness, 30 min. | 28 | 27 | 29 | 0 |

It is seen that platinum catalysts within the scope of the invention are fully stable at elevated temperatures.

Japanese Patent Application No. 326575/1995 is incorporated herein by reference.

While this invention has been described with respect to a preferred embodiment, it will be understood by those skilled in the art that various changes and modifications may be made without departing from the spirit and scope of the invention.

We claim:

1. A platinum catalyst composition comprising (A) a platinum complex having as a ligand a vinyl-containing organosiloxane of the following formula (1) or (2):

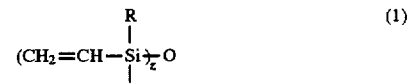

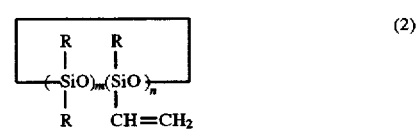

wherein R, which may be the same or different, is a substituted or unsubstituted monovalent hydrocarbon group having 1 to 8 carbon atoms, letter n is an integer of at least 1, m is an integer inclusive of 0, the sum of n+m is 3 to 8, and (B) a vinyl-containing organopolysiloxane of the following formula (3):

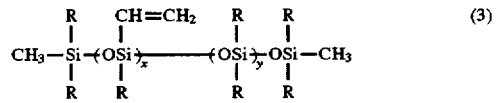

wherein R is as defined above, letters x and y are such numbers that the number of silicon atoms in a molecule ranges from 10 to 50, and the proportion of x relative to the number of silicon atoms in a molecule is 10 to 50 mol %, said composition being prepared by mixing components (A) and (B) such that 2 to 20 mol of vinyl group in component (B) is available per mol of platinum atom in component (A) and heat treating the mixture.

2. A method for preparing a platinum catalyst composition comprising the steps of mixing (A) a platinum complex having as a ligand a vinyl-containing organosiloxane of the following formula (1) or (2):

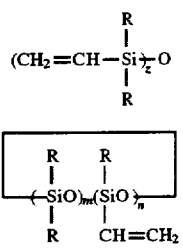  (1)

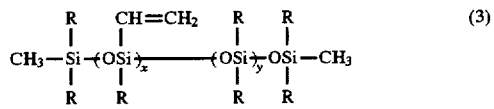  (2)

wherein R, which may be the same or different, is a substituted or unsubstituted monovalent hydrocarbon group having 1 to 8 carbon atoms, letter n is an integer of at least 1, m is an integer inclusive of 0, the sum of n+m is 3 to 8, with (B) a vinyl-containing organopolysiloxane of the following formula (3):

$$CH_3-Si(OSi)_x \cdots (OSi)_y OSi-CH_3$$ (3)

(with R groups and a CH=CH$_2$ group as shown)

wherein R is as defined above, letters x and y are such numbers that the number of silicon atoms in a molecule ranges from 10 to 50, and the proportion of x relative to the number of silicon atoms in a molecule is 10 to 50 mol %, such that at least 2 mol of vinyl group in component (B) is available per mol of platinum atom in component (A), and heating and aging the mixture at a temperature of 40° to 100° C. for at least 1 hour.

3. A curable organopolysiloxane composition comprising
an organopolysiloxane containing at least two alkenyl groups in a molecule,
an organohydrogenpolysiloxane containing at least two silicon atom-attached hydrogen atoms in a molecule, and
a platinum catalyst composition as claimed in claim 1.

4. The platinum catalyst composition of claim 1, wherein each R in formulae (1), (2) and (3) may be the same or different and is alkyl, alkenyl, phenyl, tolyl, benzyl or phenethyl, each optionally halo-substituted.

5. The platinum catalyst composition of claim 1, wherein each R in formulae (1), (2) and (3) may be the same or different and is methyl, phenyl, trifluoropropyl or vinyl.

6. The method of claim 2, wherein each R in formulae (1), (2) and (3) may be the same or different and is alkyl, alkenyl, phenyl, tolyl, benzyl or phenethyl, each optionally halo-substituted.

7. The method of claim 2, wherein each R in formulae (1), (2) and (3) may be the same or different and is methyl, phenyl, trifluoropropyl or vinyl.

8. The platinum catalyst composition of claim 1, wherein the number of silicon atoms in a molecule of the vinyl-containing organopolysiloxane (3) is from 20 to 40.

9. The method of claim 2, wherein the number of silicon atoms in a molecule of the vinyl-containing organopolysiloxane (3) is from 20 to 40.

10. The platinum catalyst composition of claim 1, wherein components (A) and (B) are mixed such that 5–10 mol of vinyl group in component (B) is available per mol of platinum atom in component (A).

11. The method of claim 2, wherein components (A) and (B) are mixed such that 2–20 mol of vinyl group in component (B) is available per mol of platinum atom in component (A).

12. The method of claim 2, wherein components (A) and (B) are mixed such that 5–10 mol of vinyl group in component (B) is available per mol of platinum atom in component (A).

13. The platinum catalyst composition of claim 1, wherein the heat treating of the mixture is conducted at 40° to 100° C. for at least one hour.

14. The platinum catalyst composition of claim 1, wherein the heat treating of the mixture is conducted at 50° to 80° C. for 5 to 24 hours.

15. The method of claim 2, wherein the heating and aging of the mixture is conducted at 50° to 80° C. for 5 to 24 hours.

16. The composition of claim 3, wherein the organopolysiloxane is of the formula:

$$R^1_a SiO_{(4-a)/2}$$

wherein the R$^1$ groups independently are substituted or unsubstituted monovalent hydrocarbon groups of 1 to 10 carbon atoms, at least two being aliphatic unsaturated hydrocarbon groups, and letter a is from 1.9 to 2.4, and wherein the organohydrogenpolysiloxane is of the formula:

$$R^2_b H_c SiO_{(4-b-c)/2}$$

wherein the R$^2$ groups independently are substituted or unsubstituted monovalent hydrocarbon groups of 1 to 10 carbon atoms free of aliphatic unsaturated bonds and letters b and c are numbers satisfying 0.6<b<2.2, 0.002≦c<2, and 0.8<b +c≦3.

17. The composition of claim 3, wherein the organohydrogenpolysiloxane is provided in an amount such that the number of moles of hydrogen atoms attached to silicon atoms is 0.4 to 5 equivalents per mole of alkenyl groups in the organopolysiloxane, and the amount of the platinum catalyst composition is such that 1 to 500 ppm of platinum atom is provided based on the total of organopolysiloxane and organohydrogenpolysiloxane.

* * * * *